United States Patent [19]

Franz et al.

[11] Patent Number: 4,836,515
[45] Date of Patent: Jun. 6, 1989

[54] TWO-CHAMBER ENGINE MOUNT HAVING VARIABLE DISC STOPS AND VARIABLE CHOKE CANAL MEANS

[75] Inventors: Rainer Franz, Mannheim; Werner Idigkeit; Hartmut Löschmann, both of Weinheim; Gerhard Röhner, Hemsbach; Klaus Kurr, Weinheim, all of Fed. Rep. of Germany

[73] Assignee: Firma Carl Freudenberg, Weinheim/Bergstrasse, Fed. Rep. of Germany

[21] Appl. No.: 26,822

[22] Filed: Mar. 17, 1987

[30] Foreign Application Priority Data

Jun. 11, 1986 [DE] Fed. Rep. of Germany ....... 3619687

[51] Int. Cl.[4] ............ B60G 15/04; F16M 5/00; F16M 13/00
[52] U.S. Cl. .................... 267/219; 180/300; 248/566; 267/140.1
[58] Field of Search ............ 267/35, 152, 113, 218, 267/217, 219, 136, 140.1, 292, 220; 188/298, 299, 319, 268; 180/300, 312; 123/192 R; 248/562, 566, 636, 638

[56] References Cited

U.S. PATENT DOCUMENTS

| | | | |
|---|---|---|---|
| 4,650,170 | 3/1987 | Fukushima | 267/140.1 |
| 4,660,812 | 4/1987 | Dan et al. | 267/140.1 |
| 4,709,779 | 12/1987 | Takehara | 267/140.1 |

FOREIGN PATENT DOCUMENTS

| | | | |
|---|---|---|---|
| 3340153 | 8/1984 | Fed. Rep. of Germany | |
| 3508823 | 9/1986 | Fed. Rep. of Germany | 188/299 |
| 0117930 | 7/1984 | Japan | 267/140.1 |

Primary Examiner—Andres Kashnikow
Assistant Examiner—Robert J. Oberleitner
Attorney, Agent, or Firm—Kenyon & Kenyon

[57] ABSTRACT

A two-chamber engine mount with hydraulic damping has a partition arranged between a working space and an equalization space. The partition is formed in a first subarea by a disc movable between stops. The play of the disc between the stops can be varied by a motor. In a second subarea, the partition is penetrated by a first choke canal. A second choke canal can be added to the first choke canal in series or parallel therewith by a motor.

5 Claims, 4 Drawing Sheets

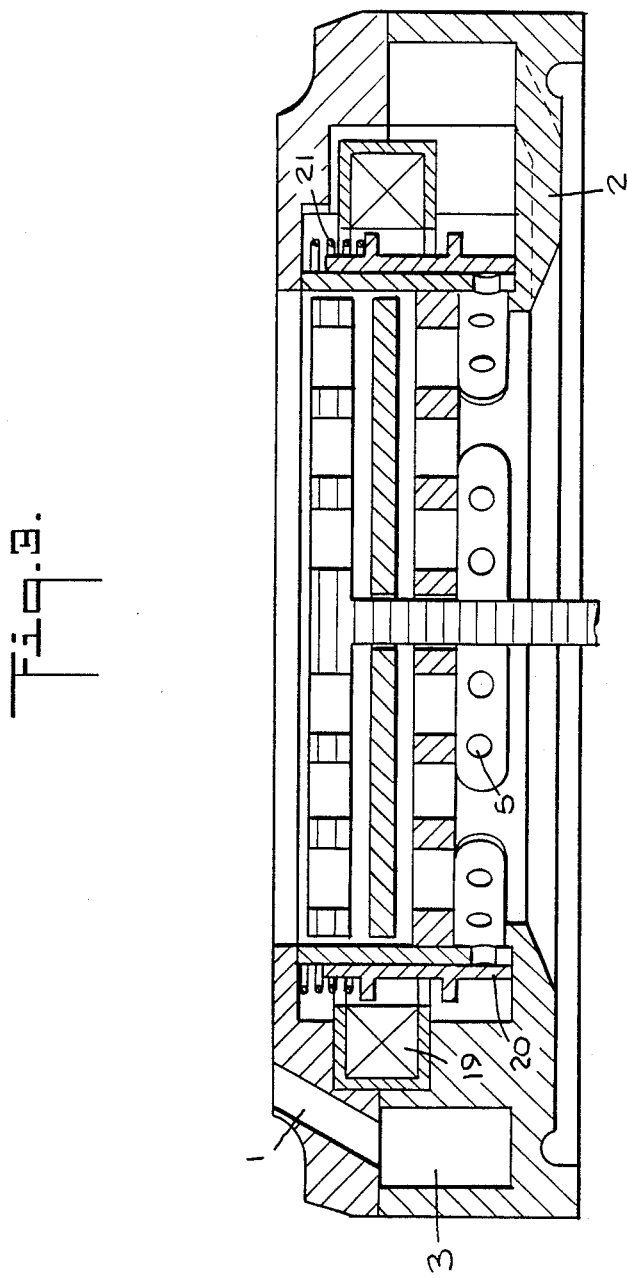

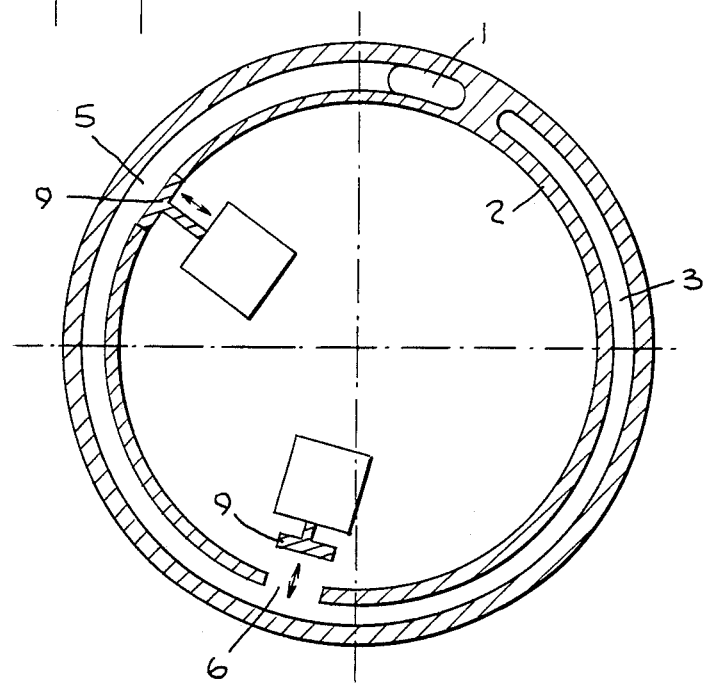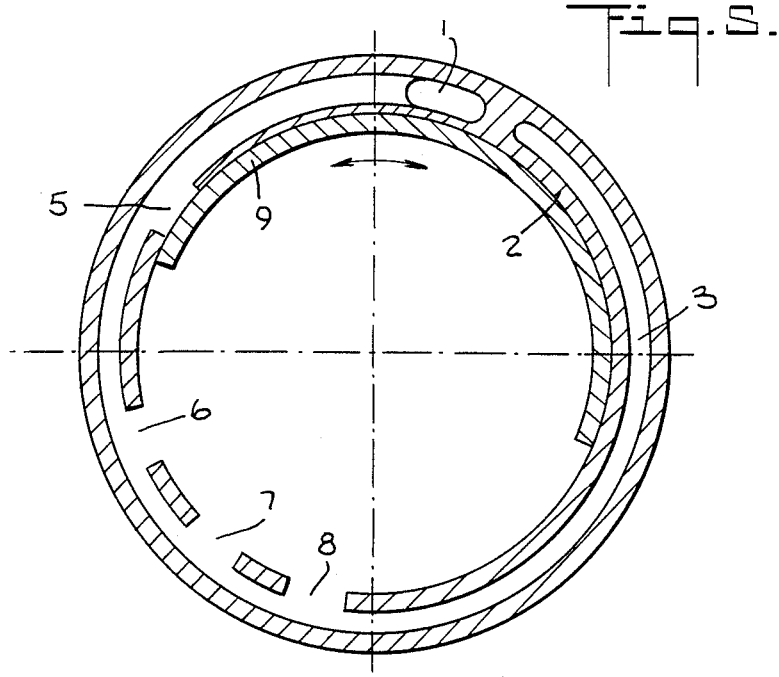

TWO-CHAMBER ENGINE MOUNT HAVING VARIABLE DISC STOPS AND VARIABLE CHOKE CANAL MEANS

FIELD OF THE INVENTION

This invention relates to a two-chamber engine mount having hydraulic damping and in which a partition is arranged between a working and an equalization space. A first sub-area of the partition comprises a disc movable between stops. A second sub-area of the partition is penetrated by a first choke canal. Choke means, which can be actuated by a motor, are associated with the first choke canal for varying the choke action.

BACKGROUND OF THE INVENTION

An engine mount of the above-mentioned type is disclosed in German Offenlegungesschrift No. 33 40 153. The choke canal which penetrates the partition and connects the working space to the equalization space in this reference comprises a choke means which is driven by a motor and is operated by sensors mounted on the engine and/or the chassis and which imparts to the two-chamber engine mount different damping characteristics as a function of the type of the occurring vibrations.

OBJECTS OF THE INVENTION

It is an object of the present invention to further develop a two-chamber engine mount of the type mentioned at the outset so that all vibrations emanating from the engine are isolated in an optimum manner from the car body supporting the engine These and other objects of the present invention will become apparent from the following description and claims in conjunction with the drawings.

SUMMARY OF THE INVENTION

According to the present invention, a two-chamber engine mount of the type mentioned at the outset is provided wherein the play of the disc determined by the stops can be varied by a motor and the choke means comprises at least one second choke canal which can be connected in series with or in parallel to the first choke canal. Furthermore, step-wise adjustability of the play of the disc and/or the length of the second choke canal has been found to be practical.

In the two-chamber engine mount according to the present invention, means are provided to vary the play of the disc as well as the effective length of the choke canal as required by operating conditions by use of a motor. For this purpose, sensors are provided on the supported combustion engine which determine the different operating conditions in a representative manner and pass them on to a computing unit. A particularly suitable input variable for determining the different operating conditions is the speed of the combustion engine. This can be ascertained, for instance, at the crank shaft, at the ignition distributor, or in the injection facility. Other sensors can measure at the chassis, the axles and/or the superstructure the accelerations present there and feed them to the computer.

The signals obtained in this manner are transformed in the computing unit and utilized for optimum variation of the play of the disc and the choke effect of the choke canal. In the engine mount according to the present invention, both are accomplished by means of motor drives and, advantageously, electric-motor drives, with a combination in a closed drive unit likewise being possible. Preference is given to a design in which the play of the disc and the choke action of the choke canal can be varied independently of each other.

In the engine mount according to the present invention, the play of the disc is advantageously varied by a relative change of the relationship of the stops and the disc which oscillates between the stops. To achieve this purpose, at least one of the stops can be movable in a guide arranged perpendicular to the plane of the disc. The driving means can comprise a motor-driven threaded spindle or rack. The use of an electromagnetically, a hydraulically or a pneumatically operable drive is also possible.

The choke aperture of the engine mount according to the present invention is advantageously designed in the form of a canal so that good damping action can be achieved using suppression effects. The damping action achieved by a choke canal conventional is basically effective only in a relatively narrow frequency range which, in the engine mount according to the invention, can be extended to any degree required by a corresponding increase of the effective length of the choke canal. Resonance peaks of the engine put in vibratory motion by travelling over an uneven road can thereby be suppressed extremely well at any speed. The high-frequency vibrations excited by the engine itself can reliably be kept away from the body of the vehicle by an adapted change of the play of the disc.

For achieving this purpose, it has been found to be particularly advantageous if the computing unit used is freely programmable, depending on the specific requirements of the prevailing operating conditions, and thereby modifies the play of the disc and the choke action of the choke aperture to the extent required. It is also possible to take into consideration braking, centrifugal or acceleration forces, the vehicle loading and the travel velocity without further expenditures, and this permits optimum prevention of the transmission of interfering vibrations of the engine to the vehicle body.

BRIEF DESCRIPTION OF THE DRAWINGS

Illustrative embodiments of an engine mount according to the present invention are shown in the drawings.

FIG. 3 schematically illustrates, in enlarged longitudinal section, the choke canal region of the engine mount according to FIG. 1.

FIGS. 4 and 5 schematically illustrate other embodiments and possible relationships of valves and a choke canal which is provided with several transverse passages.

DETAILED DESCRIPTION

Figure 1:
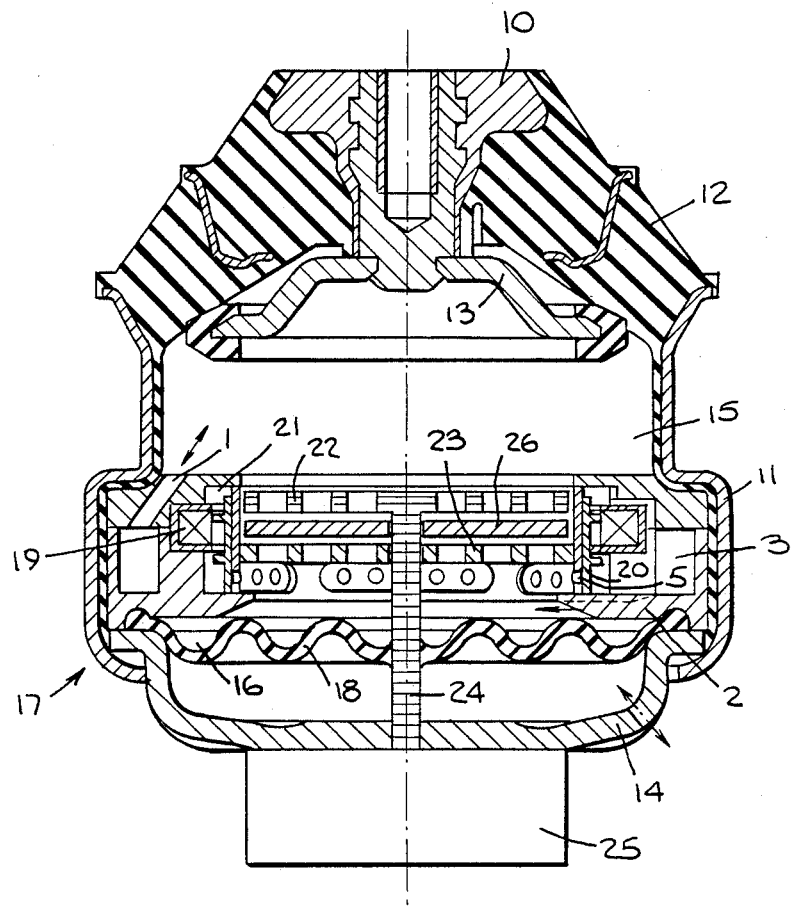
FIG. 1 schematically illustrates, in longitudinal cross-section, one embodiment of a two-chamber engine mount according to the present invention.
Figure 2:
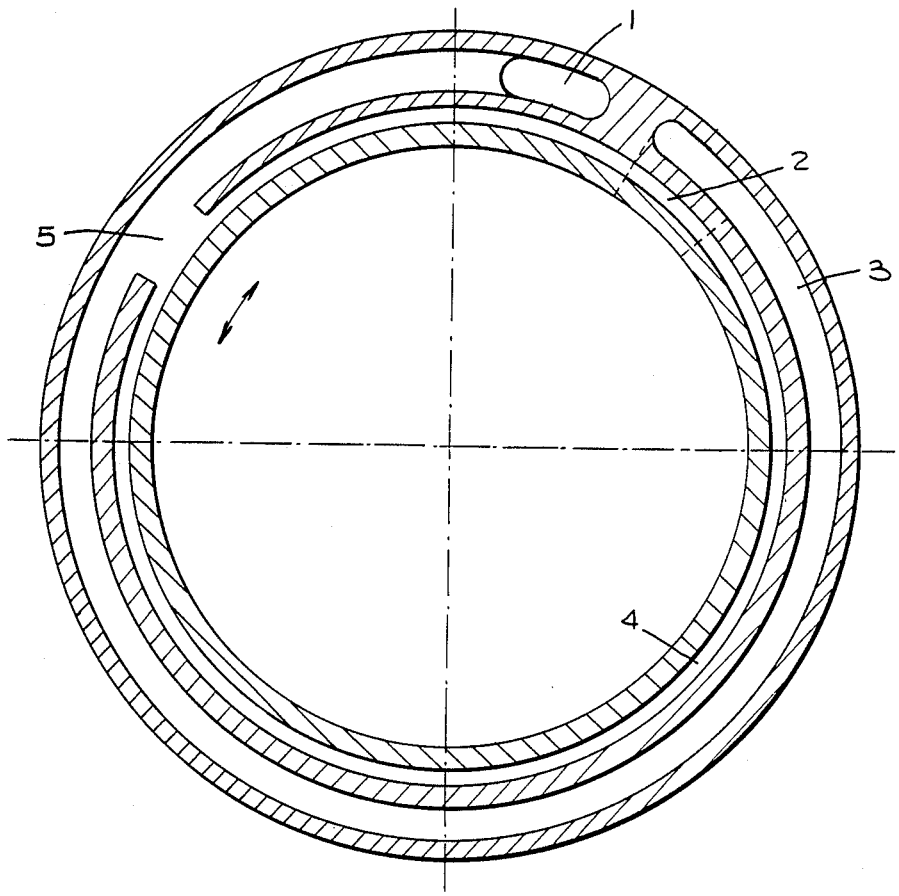
FIG. 2 illustrates a top view of the choke canal region of the engine mount according to FIG. 1.

The engine mount illustrated in FIG. 1 comprises a seat 10 and the supporting bearing 11 which are connected by the support spring 12, suitably fabricated from rubber or other elastic material, and which is designed in the form of a hollow cone. The support bearing 11 encloses in its lower part the rigidly correlated partition 17 which is arranged between a working space 15 and an equalization space 16 of the engine mount. The equalization space 16 is defined on the underside by the cup diaphragm 18 which can give way in the direction of the bottom plate 14 as liquid displaced from the working space 15 is increasingly fed in. The bottom plate 14 is likewise relatively immovalby fixed to the support bearing 11. The two-chamber engine mount overall is suitably of rotation-symmetrical shape, whereby easy placement in the engine compartment of the motor vehicle is possible.

The mounting is accomplished e.g., by a mutual screw connection of the seat 10 to the engine and the bottom plate 14 to the body of the supporting vehicle.

An end stop 13, arranged in the interior of the working space 15, serves for protection against excessive divergent motions of the seat 10 relative to the support bearing 11. FIG. 1 illustrates the engine mount in a non-installed, unloaded condition. After the internal combustion engine is put in place, the end stop 13 always is a spaced distance from the support spring 12 due to the resulting spring action of the seat 10.

The working space 15 and the equalization space 16 of the two-chamber engine mount illustrated in FIG. 1 are connected by the choke canal 3 which is connected in fluid communication to the working space 15 by the input opening 1 and to the equalization space 16 by the output opening 2. The working space 15, the choke canal 3, and the equalization space 16 are completely filled with an incompressible liquid, e.g., a mixture of glycol and water.

In the embodiment of a two-chamber engine mount illustrated in FIG. 1, the choke canal 3 is arranged in the part of the partition 17 which is rigidly connected to the support bearing 11. In this embodiment, the choke canal 3 has a rectangular profile and encloses the inner part of the partition 17 circularly. A transverse passage 5 is provided at a selected distance from the inlet opening 1 and the outlet opening 2. When transverse passage 5 is closed, the portions of the choke canal 3 between inlet opening 1 to passage 5 and passage 5 to outlet opening 2 may be said to be in series. When passage 5 is open, these choke canal portions may be said to be in parallel. The transverse passage 5 can be closed off by a signal-operated valve. In the open condition of the valve, transverse passage 5 is in direct fluid communication with the equalization space 16. If the valve is opened, amount of liquid entering the choke canal 3 via the inlet opening 1 does not flow through the entire length of the choke canal 3, but only through that length which is limited on the one hand by the inlet opening 1 and on the other hand, by the transverse passage 5. Consequently, the frequency of the vibrations damped by absorber effects corresponds to the frequency at which the liquid mass contained in the mentioned region of the choke canal can be set into a resonant vibration by the bulging elasticity of the support spring 12. It will be apparent that the liquid column swinging back and forth in the choke canal is magnified by the closing of the signal-actuated valve, which leads to a corresponding amplification of the liquid mass swinging back and forth and thereby to a lowering of the resonance frequency. The effectiveness of the damping is accordingly shifted, and thus is easily controlled by actuating the valve. In the embodiment according to FIG. 1, the signal actuated valve is designed as a slide valve. A cylindrical control slide 20 comprising a soft steel is arranged radially within a magnet coil 19. When the magnet coil 19 is not energized, the control slide 20 is displaced axially by the force of the compression spring 21 relative to the latter and this causes the closing of the openings of the transverse passages 5 distributed over the circumference. If the seat 10 is sprung elastically, the liquid entering the choke canal 3 via the inlet opening can therefore leave the choke canal 3 only at its end via the outlet opening 2 in the direction toward the equalization space 16, and if the seat 10 is sprung, takes the same path in the reverse direction. Accordingly, the total mass of liquid contained in the choke canal 3, in conjunction with the bulging elasticity of the support spring 12, determines the frequency location of the damped vibration.

Energizing the magnet in coil 19 causes an axial displacement of the control slider 20 against the force of the compression spring 21, whereby the openings of the transverse passages 5 are released for liquid flow therethrough in the direction toward the equalization space. The amount of liquid entering the choke canal 3 via the inlet opening, when the seat 10 is sprung in, is therefore no longer forced to flow through the choke canal over its entire length, but leaves the choke canal after a short passage via the transverse passage 5. A direction reversal is only obtained when the seat 10 is sprung out. The damping action based on cancellation effects is therefore effective in a correspondingly higher frequency range.

The partition 17 of the engine mount according to the embodiment in FIG. 1 encloses in its central region an annular disc 26 o flat shape. The disc 26 is arranged between the stops 22, 23 of the partition 17 and can be designed relatively stiff. A small amount of flexibility, which permits bulging of the disc into the openings of the grid plates, is of advantage.

The bottom stop 23 is formed by a flat grid plate which is fixed in an immovable position relative to the partition 17. The bottom grid plate 23 is penetrated in its central part by a rod 24 which forms a one-piece part of the upper stop 22 which is likewise grid plate. The rod 24 is vulcanized to the cup diaphragm 18, brought through a central opening of the disc 26 and is connected at its lower end to a linear stepping motor 25. If the linear stepping motor 25 is actuated by a signal, an axial displacement of the upper stop 22 relative to the lower stop 23 is obtained. Thus, the relative mobility of the disc 26 between the upper stop 22 and the lower stop 23 can be varied as required. Therefore, by appropriate variation of the relative mobility of the disc 26 between the stops 22, 23, high-frequency vibrations above 30 Hz excited by the engine no longer lead to the occurrence of pressure changes in the working space 15. Reactions on the support bearing 11 and thereby, the supporting vehicle body are no longer possible.

The partition 17 of the embodiment illustrated encloses in its central part a flexible diaphragm bounded by a circle. This diaphragm can compensate by its resilience high-frequency vibrations above 30 Hz as excited by the engine, and prevents in this manner the occurrence of pressure changes in the working space 15 which are caused by such corresponding vibrations. Therefore, corresponding vibrations can not be detected in the support bearing 11 and are isolated with excellent results.

FIGS. 4 and 5 illustrate two alternate possible embodiments with respect to the design of the choke canal, the transverse passages and valves. In the embodiment of FIG. 4, two transverse passages 5, 6 are arranged between the inlet and the outlet openings 1, 2 of the choke canal 3. In the embodiment of FIG. 5, there are four transverse passages 5, 6, 7, 8. In both cases, the outlet opening 2 is arranged in a plane deviating from the inlet opening 1 and is therefore drawn invisibly.

In the embodiment according to FIG. 4, two electromagnetically operated stopcocks 9 are associated with the transverse passages 5, 6 which can be actuated independently of each other with each having a drive of its own.

In the embodiment according to FIG. 5, the openings of all transverse passages 5, 6, 7, 8 are associated with a central control slide 9 driven by a stepping motor, not shown. The slider can be moved by relative rotation over an increasing number of openings which leads to a blockage of the permeability of the corresponding transverse passages. An increase of the number of transverse passages requires in this case only the additional provision of a further hole. An extremely fine adjustment of the damping effect to different frequencies is thereby easily achievable.

Although preferred embodiments of the present invention have been described in detail, it will be apparent that modifications may be made by one skilled in the art within the spirit and scope of the present invention as defined in the claims.

What is claimed is:

1. In a two-chamber engine mount having hydraulic damping comprising:
   means for defining a working space;
   means for defining an equilization space;
   partition means disposed between said working space and said equilization space, with said partition means having a first sub-area and a second sub-area;
   said first sub-area of said partition means being defined by first and second stops spaced from one another at a preselected distance;
   a disc member disposed and movable between said first and second stops;
   said second sub-area of said partition means being penetrated by a choke canal means having a length for providing choked liquid communication between said working space and said equalization space;
   the improvement comprising:
   motor means for varying said preselected distance between said first and second stops thereby varying the available movement of said disc member between said first and second stops; and
   motor actuated choke means in association with said choke canal means for varying the length of said choke canal means providing choked liquid communication between said working space and said equalization space.

2. The two-chamber engine mount of claim 1 wherein said preselected distance between said first and second stops is varied continuously.

3. The two-chamber engine mount of claim 2 having means for continuously varying the length of said choke canal means.

4. The two-chamber engine mount of claim 1 having means for continuously varying the length of said choke canal means.

5. The two chamber mount of claim 1, wherein transverse passages are arranged between the inlet and the outlet openings of the choke canal means, and magnetic stopcocks are associated with the transverse passages and can be actuated independently of each other with each having a drive of its own.

* * * * *